May 14, 1946. J. M. HALL 2,400,458
APPARATUS FOR DEHYDRATING LIQUID PRODUCTS
Original Filed Feb. 7, 1940  2 Sheets-Sheet 1
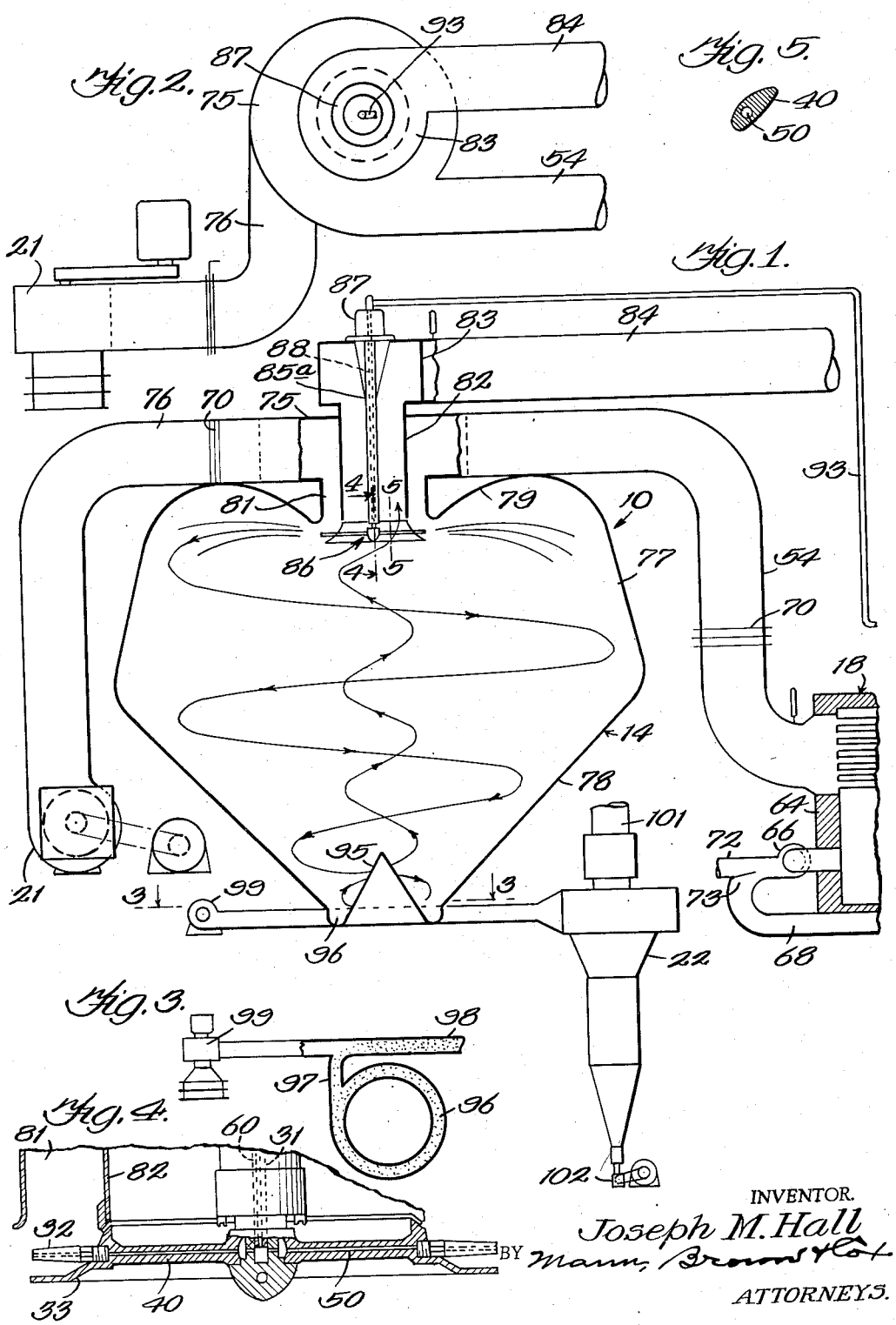
INVENTOR.
Joseph M. Hall
BY Mann, Brown & Co.
ATTORNEYS.

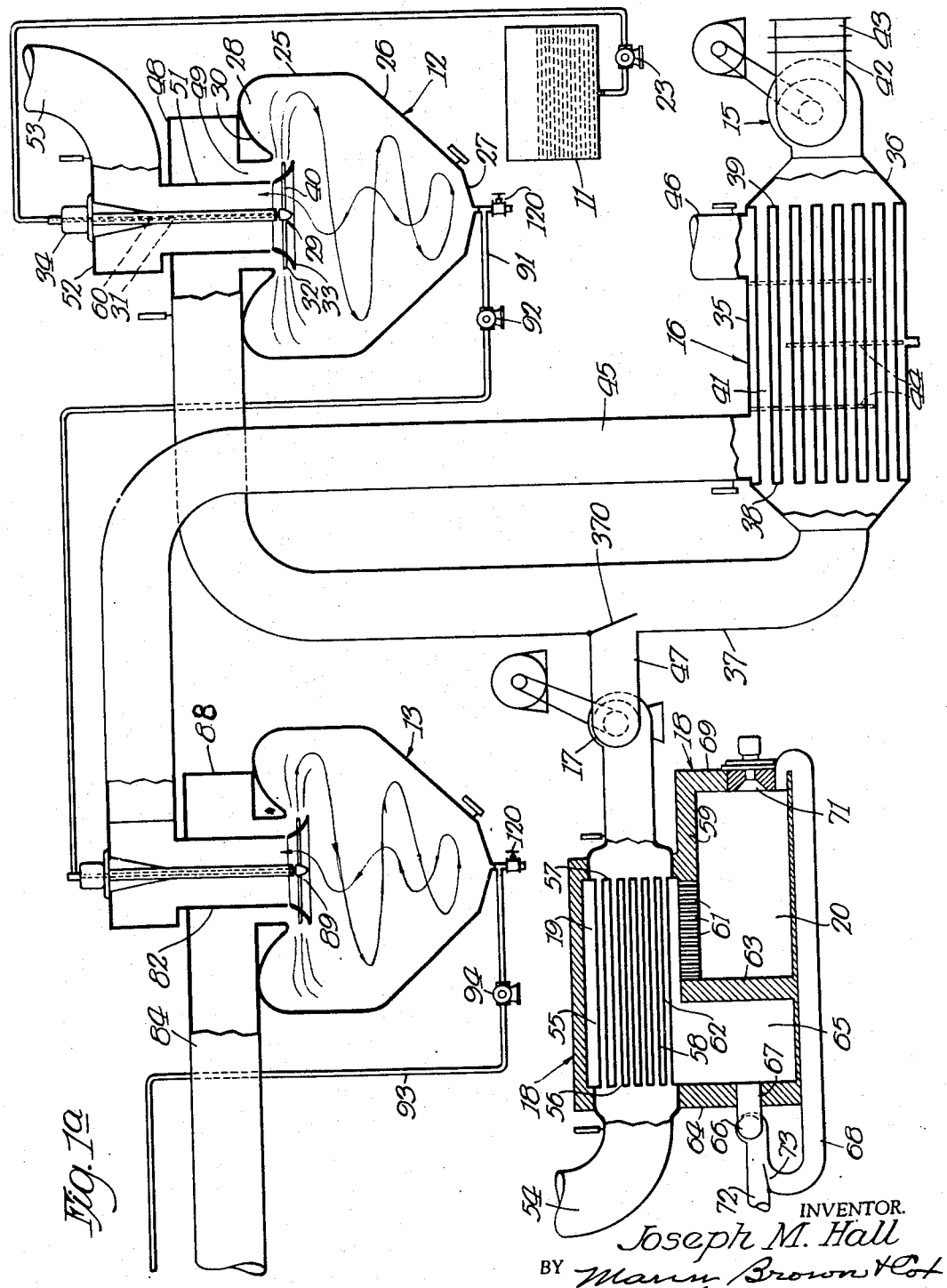

Patented May 14, 1946

2,400,458

UNITED STATES PATENT OFFICE 2,400,458

APPARATUS FOR DEHYDRATING LIQUID PRODUCTS

Joseph M. Hall, Chicago, Ill., assignor to Drying & Concentrating Company, a corporation of Delaware Original application February 7, 1940, Serial No. 317,720. Divided and this application June 25, 1942, Serial No. 448,380

11 Claims. (Cl. 159—4)

This invention relates to a system of desiccating or dehydrating liquid products; and one of the principal objects of the invention is the provision of a new and improved arrangement of the various structures of the system whereby a large amount of air at atmospheric temperature may be mixed with a quantity of heated air for forming the dehydrating medium.

Another object of the invention is the provision of a new and improved dehydrating system having novel means for dehydrating liquid products, and novel means for circulating the drying medium.

A further object of the invention is the provision of a new and improved means for insuring delivery of the dehydrated product from the dehydrator in a continuous process.

Another object of the invention is the utilization of a large portion of fresh air in the drying medium without first passing it through a heater.

A further object of the invention is the provision of a new and improved system of dehydrating liquid products wherein fresh air heated by the discharged drying medium is employed for initially concentrating the product.

A still further object of the invention is the provision of a new and improved evaporator mechanism for utilizing residual heat contained in the drying medium after dehydrating the liquid product for preheating the drying medium for use in both the initial and final steps in the concentration and dehydration operation.

Another object of the invention is the provision of a new and improved system for dehydrating liquid products employing an apparatus that is simple in construction, efficient and economical in operation, requires a minimum of artificial heat, is composed of few parts, and that is not likely to become deranged or get out of order.

Other and further objects and advantages of the invention will appear from the following description, taken in connection with the accompanying drawings, in which—

Fig. 1 is a diagrammatic view in elevation of a portion of an apparatus for dehydrating liquid products;

Fig. 1ª is a similar view of the remaining portion of the apparatus;

Fig. 2 is a top plan view of a portion of the construction shown in Fig. 1;

Fig. 3 is a section on the line 3—3 of Fig. 1;

Fig. 4 is a cross-section on the line 4—4 of Fig. 1; and

Fig. 5 is a section on the line 5—5 of Fig. 1.

In dehydrating liquid products it is common practice to remove the moisture from the product by a heating gaseous medium, such as air, dry steam, or the like. The present invention employs heated air for this purpose. Air under atmospheric conditions is usually much below its saturation point, and consequently it possesses considerable capacity for absorbing moisture.

The present invention seeks to take advantage of this fact in the provision of means for heating only a portion of the air supplied to the dehydrator, and to mix this heated portion with a copious supply of air under atmospheric conditions immediately prior to the dehydrating operation. By means of this arrangement an economy in heat units is obtained due to utilizing such a large number of heat units contained in air under atmospheric conditions. A high rate of evaporation may be obtained at moderately elevated temperatures of the heating medium if the liquid product be atomized and projected into direct contact with the heating medium while it is moving at high velocity.

In the present invention the concentration and dehydration are accomplished by projecting the atomized liquid product into spirally moving currents of moderately heated air. The outward and downward movement of the liquid particles through the air, together with their centrifugal movement radially outward in the spirally moving heated current of air, insures a constantly changing contact of those particles and air, and such everchanging contact is conducive to a high rate of evaporation. With this system excellent results may be obtained by the use of air heated but a few degrees above the boiling point of water, say from 220° to 225° F., although much higher temperatures may be employed, if desired. The evaporation of the moisture from around the particles prevents the particles from becoming overheated while they contain moisture. But the evaporation of the moisture quickly lowers the temperature of the air so that the dried particles do not come in contact with air at temperatures sufficiently high to injuriously affect the product. Furthermore, the process is of such short duration that the particles are not subjected to heat even at moderately high temperatures for but a few moments.

Referring now to the drawings, the reference character 10 designates the apparatus which comprises a tank 11 for containing the liquid product to be dehydrated; an evaporator or dehydrator chamber or cabinet 12, which, for convenience, may be termed the first evaporator or evaporator chamber; a second evaporator or dehydrator chamber or cabinet 13, which may be termed the second evaporator; and an evaporator or dehydrator chamber or cabinet 14, which may be termed the third evaporator, in which the liquid product is dehydrated. For convenience the chamber 14 will be referred to in the description as the dehydrator or dehydrator chamber. The apparatus also comprises a fan 15 which introduces air into the system and causes it to flow through a heat exchanger 16; a second fan 17; a furnace 18 having the heater 19; and a blower 21 for introducing fresh air into the system at the intake of the dehydrator 14, as will presently appear. A collector 22 is also provided for collecting the dehydrated material discharged from the dehydrator 14. The liquid product and the drying medium pass through the second evaporator and the dehydrator in opposite directions.

Referring now to Fig. 1ª, the liquid product contained in the reservoir or container 11 is forced by the pump 23 through the conduit 24 into the first evaporator 12 in the usual manner. The first evaporator 12 is of the centrifugal separator type, and comprises an upper cylindrical section 25 and a lower tapered section 26. The lower end 27 of the tapered portion 26 has its walls at a more obtuse angle to the axis of the chamber than the remaining part of the tapered portion for shortening the height of the evaporator, as clearly shown in said figure. The upper part of the cylindrical portion 25 is closed by the top wall 30, which may have its central part depressed to form an annular upwardly extending portion 28 of the main chamber which extends above the distributor or spray member 29, as will presently appear.

The distributor member 29 is in the form shown in my copending application Serial No. 275,934, filed May 26, 1939, and comprises a rotating hollow shaft 31 (Fig. 4), extending axially downwardly through the upper portion of the chamber 25, and has attached at its lower end a plurality of arms 40 having nozzles 32 attached thereto. Attached to the arms 40 is an annular deflector member 33, concave on its upper surface. The distributor member 29 is attached to the hollow shaft 31 and is rotated by a motor 34. The arms 40, to which the nozzles 32 are attached, are each provided with a passage 50 in communication with the passage 60 formed in the hollow shaft 31, and are shaped to form fan blades, as shown at 40 in Fig. 5, for exhausting air from the chamber 12. The liquid product passes downwardly from the conduit 24 through the hollow rotating shaft 31, through the passages in the arms 40, and by the action of centrifugal force it is discharged from the nozzles 32 into the evaporator 12 in the form of a spray of finely divided particles.

Suitable means are provided for evaporating a portion of the moisture sprayed into the cabinet or chamber. In the form of construction shown, air is employed as the heating and evaporating medium. This air is heated and circulated through the system, including the heat exchanger 16, in a manner that will shortly be described.

The heat exchanger 16 comprises an outer casing 35 having a tapered end 36 in communication with the discharge of the fan 15. The casing is tapered at its opposite end, and is in communication with a conduit 37. The casing is provided at each end with partitions or flue sheets 38 and 39, which are perforated and have tubes or flues 41 secured in the perforations, the tubes forming passages for the air through the heat exchanger. The intake 42 of the fan 15 is provided with suitable filters 43 so as to clean the fresh air introduced into the system and forced by the fan 15 through the heat exchanger 16. The air introduced by the fan 15 is heated in the exchanger by the air exhausted from the second evaporator, as will presently appear.

Mounted within the casing 16 are a plurality of baffles 44 extending from opposite sides of the heat exchanger so as to cause the heated air exhausted from the second evaporator 13, and introduced through the conduit 45 into the casing 35 at one end thereof, to take a zig-zag course through the heat exchanger as it flows around the tubes 41 and out through the discharge conduit 46 at the opposite end of the casing 35, thereby imparting a maximum amount of heat to the air introduced into the conduit 37 by the fan 15. The air passing through the heat exchanger 16 from the conduit 45 is discharged through a pipe 46 into the atmosphere, after it has imparted heat to the air introduced into the heat exchanger by the fan 15, or it may be used for other heating purposes about the plant.

A portion of the air flowing through the heat exchanger 16 from the fan 15 may be diverted by an adjustable valve 370 into the conduit 47, and the remainder is delivered to a snail 48 which discharges the air in a spiral form through the opening 49 into the chamber 12 onto the deflector 33 across the spray of the liquid product. This heated air, moving spirally downwardly around the walls of the chamber, then upwardly in an inner spiral, is exhausted by the fan formed by the distributor 29 through a sleeve or conduit 51 extending axially upwardly through the snail 48 into the casing 52, from which it is finally discharged through the conduit 53. The intimate contact between the heated air and atomized particles of the liquid product within the first evaporator 12 evaporates a considerable portion of the moisture, and the concentrate falls or flows by gravity to the bottom of said evaporator.

A portion of the air deflected into the conduit 47 by the valve 370 is caused to flow through the heater 19 of the furnace 18 into the conduit 54 by the fan 17. The furnace 18 comprises the heater or heating chamber 19 and the combustion chamber 20. The heater 19, which is in the upper portion of the furnace 18, comprises a casing 55 provided with the flue sheets or partitions 56 and 57, which are perforated and have tubes or flues 58 secured therein through which air from the fan 17 passes to the conduit 54. The top wall 59 of the combustion chamber is provided at its front end with passages 61 through which the heated gases pass into the heater 19 about the forward end portions of the tubes 58 for heating the air as it passes through said tubes.

The heater chamber is provided with one or more baffles 62, one being shown, which causes the heated combustion gases to take a zig-zag path therethrough. The rear wall 63 of the combustion chamber is spaced forwardly of the rear wall 64 of the furnace to form a discharge chamber 65 for the exhaust gases. In order to conserve heat a portion of these gases may be recirculated by a fan 66. This fan exhausts from the chamber 65 through a conduit 67 connected with the intake of the fan, and discharges into a conduit 68. This conduit returns the heated gases to the combustion chamber through the front wall 69 of the furnace. The remainder of the gases in the chamber 65 is discharged into the stack through a conduit 72. A valve 73 is provided for directing all, or a portion, of the gas into the conduit 68, as may be desired.

The air, in passing through the heater 19, is heated to a high temperature and is delivered, in this heated condition, through the conduit 54 to a snail 75 having an outlet into the dehydrator 14. The conduit 54 may be provided with an air filter 70, if desired. A large volume of fresh air, at atmospheric temperature, is adapted to be mixed with the highly heated air from the furnace 18. In the form of construction selected to illustrate one embodiment of the invention, the blower 21 is employed for this purpose.

The blower 21 draws in fresh air and discharges it through the conduit 76 and through the filter 70 in said conduit, into the snail 75 of conventional design, where it is thoroughly mixed with the heated air by the gyratory motion given the two streams of air by said snail.

The dehydrator 14 is similar to the first evaporator, and comprises an upper portion 77, a lower tapered portion 78, and a depressed top portion 79. The top portion 79 is provided with an enlarged opening 81, the walls of which are integral with the snail 75 and constitute an outlet for said snail. Extending axially downwardly through the opening 81 and axially of the dehydrator is a sleeve or cylindrical casing 82 of less diameter than the opening 81, and which is connected at its upper end to, and supported by, an enlarged casing 83, which in turn is in communication with a conduit 84 leading to the second evaporator chamber 13. Extending axially downwardly through the casing 83 and sleeve or cylindrical casing 82 is a hollow shaft 85, through which the concentrated liquid product is delivered to the rotating distributor head or member 86 beneath the sleeve or casing 82. The shaft 85 is protected by a sleeve 85ª surrounding the same. This shaft is adapted to be rotated in any suitable manner, as by means of the motor 87.

Since the distributor member or distributor 86 is similar to the distributor 29 already described, it is not thought necessary to further illustrate or describe the same further than to say that the distributor or distributor member, as in the one previously described, functions as an atomizer and as an exhaust fan for removing the air or evaporating medium from the chamber 14.

The drying medium passes from the snail 75 into the dehydrator and is directed across the spray for dehydrating the sprayed particles, as in the previous construction. This air passes downwardly in a spiral path to the lower portion of the dehydrator and then passes upwardly in a spiral path of smaller diameter, and is exhausted through the casing 82 by the spray head 86, the arms of which are constructed to constitute an exhaust fan. These arms are flattened and turned at an angle to form the fan blades, as shown in Figs. 4 and 5. The dry particles of the product are thrown by centrifugal force against the walls of the cabinet and fall by gravity to the bottom of the cabinet.

The lower end of the dehydrator 14 is provided with an upstanding conical member 95. The conical member 95 may be integral with the walls of the dehydrator and forms with said walls an annular channel or passage 96. The passage 96 is connected with an outlet passage 97 (Fig. 3), which is tangential to the passage 96.

The air discharged from the dehydrator 14, while its temperature has been lowered, is still far above its saturation point, and for that reason is employed in concentrating the liquid product after it leaves the first evaporator. The air passing along the conduit 84 from the dehydrator 14 enters a snail 88, which delivers the air into the second evaporator 13 in a spiral form across the nozzles of the spray head 89 for evaporating moisture from the concentrated liquid product. Since the construction of the evaporator 13 is similar to the evaporator 12 and the parts are similarly arranged and function in a like manner, it is not thought necessarry to repeat the description of the same at this point.

The air, after passing spirally downwardly to the lower portion of the second evaporator, and then upwardly in an inner spiral, is exhausted from the evaporator 13 by the distributor 89 into the conduit 45, and from thence the air passes through the heat exchanger 16 for heating fresh air forced through the heat exchanger by the fan 15, as has already been described.

It will thus be seen that the liquid product has a portion of its moisture evaporated in the first evaporator 12 by fresh air which is heated from the air discharged from the second evaporator, and that the concentrate which is discharged from the bottom of the first evaporator 12 into a conduit 91 is forced by the pump 92 into the second evaporator 13, where it is further concentrated in said evaporator by air discharged from the dehydrator 14. The concentrate from the evaporator chamber 13 is caused to flow through a conduit 93 by a pump 94 into the dehydrator 14, where it is sprayed into heated air moving spirally in the dehydrator and dehydrated or reduced to a powder which is collected in the lower portion of the dehydrator 14 and the powder removed therefrom to the separator 22. In other words, the liquid advances from the first evaporator 12 to the second evaporator 13 and thence to the dehydrator 14, whereas the air advances in the opposite direction through first the dehydrator 14 and then the second evaporator 13. Fresh air is employed in the first evaporator, but this air is heated by the air discharged from the second evaporator.

In the operation of centrifugal separators there is usually a partial vacuum formed along the axis of the separator, due to the centrifugal action of the rotating mass of air. As a result of this phenomenon some of the dried particles may be carried upwardly by the rotating inner column of air and are in turn thrown outwardly by the centrifugal force of the inner column into the outer rotating column, thus starting the cycle all over again.

Suitable means are provided for preventing this recirculation by causing the particles to be discharged from the cabinet as soon as they are deposited in the lower part thereof. As shown, this is accomplished by causing a blast of air to be discharged across the outer end of the conduit 97 so as to partially exhaust the air from said conduit by induction. As shown, this is accomplished by a conduit 98 through which a current of fresh air is caused to flow by a fan 99. The outer end of the conduit 97, where it is connected to the conduit 98, is so constructed that it discharges into the conduit and in the direction of the flow of air therein, and as a result a partial vacuum is created by induction in the conduits 97 and 96. The air and dehydrated material is delivered by the conduit 98 into a centrifugal air separator 22 of a conventional type. The air is discharged axially from the separator through the conduit 101, and the material is discharged through a power control valve 102 in the lower portion of the separator 22, as is usual in such constructions. Since the separator 22 is of the usual or any well known construction, it is not necessary to describe the details of the same.

It will thus be seen that in this system only a portion of the gaseous drying medium is heated, and that the remaining portion of the drying medium is introduced directly from the atmosphere.

The product may, if desired, be removed from either the first or second evaporators through the valves 120 in a more or less concentrated form, as desired.

While the apparatus is described as a mechanism for dehydrating a liquid, it is understood that it is also adapted to be employed in dehydrating fluid products of various kinds, as comminuted foods in fluid state, and the like.

This application is a division of my application for Method of and apparatus for dehydrating liquid products, filed February 7, 1940, Serial No. 317,720, which matured in Patent No. 2,290,470, dated July 21, 1942.

It is thought from the foregoing, taken in connection with the accompanying drawings, that the construction and operation of my device will be apparent to those skilled in the art, and that changes in size, shape, proportion and detail may be made without departing from the spirit and scope of the appended claims.

I claim as my invention:

1. In a system for dehydrating a liquid product, a plurality of evaporator chambers, a heat exchanger, a heater, means for conducting fresh air through said exchanger for preheating said air, a conduit for conducting a portion of said preheated air through said heater to certain of said evaporator chambers, a conduit for conducting the remainder of said preheated air to the remainder of said evaporator chambers, and means for conducting the first-named portion of said preheated air back to said exchanger from one of said certain evaporator chambers for preheating incoming fresh air.

2. In a system for dehydrating a liquid product, a first evaporator, a second evaporator, a heat exchanger, a heater, means for conducting fresh air through said exchanger for preheating the said air, means for conducting a portion of said air through said heater and through said second evaporator, means for conducting said last-named air back to and through said exchanger for preheating said fresh air, means for conducting the remainder of said fresh air to and through said first evaporator, means for spraying a liquid product into the air flowing through the first evaporator chamber and for spraying the concentrate into the air flowing through the second evaporator.

3. In a system for dehydrating a liquid product, a first evaporator, a second evaporator, a heater, a heat exchanger, means for conducting a copious supply of fresh air through said exchanger to said first evaporator and for causing the same to pass through said evaporator in a downwardly moving spiral and then in an upwardly moving spiral, and means for conducting a portion of said fresh air passing through said exchanger to said heater and said second evaporator and back through said exchanger for heating air supplied to said first evaporator.

4. In a system for dehydrating a liquid product, an evaporator, a dehydrator, a heat exchanger, a heater, means for conducting a fresh supply of drying medium through said exchanger, means for conducting a portion of said drying medium to said evaporator and the remainder through said heater to said dehydrator, means for conducting said remainder of drying medium from said dehydrator back through said heat exchanger for preheating said drying medium, means for varying the proportionate amounts of said drying medium flowing to said evaporator and dehydrator, means for spraying a liquid product into said drying medium within said evaporator, and means for spraying the concentrate into the drying medium in said dehydrator.

5. In a dehydrating system, a first evaporator, a second evaporator, a dehydrator, an air heater, a heat exchanger, means for causing air to flow through said heater and for discharging the same into said dehydrator in a spiral, means for conducting air from said dehydrator to the second evaporator and for discharging the same in a spiral into said last-named evaporator, means for conducting the air from said second evaporator through said heat exchanger, means for conducting fresh air through said heat exchanger for heating the same, means for causing said last-named air to move spirally in said first evaporator, means for spraying a liquid product into the spirally moving air within said first evaporator for concentrating said product, means for spraying the concentrated product into the spirally moving air within said second evaporator for further concentrating said product, and means for spraying the concentrated product from said second evaporator into said spirally moving air within said dehydrator for desiccating said product.

6. In a dehydrating system, a plurality of evaporator chambers, a heat exchanger, a heater, means for conducting fresh air through said heat exchanger for heating said air, means for dividing said fresh air, means for causing a portion of the divided air to flow spirally downwardly and then spirally upwardly within one of said chambers, means for causing the other portion of said air to flow through said heater, through the remainder of said chambers and through said heat exchanger, means for spraying a liquid product into said one chamber, and means for spraying the concentrated liquid product from said last-named chamber into the remaining chambers.

7. In a system for dehydrating a liquid product, an initial evaporating chamber, a heat exchanger, a second evaporating chamber, means for causing a stream of fresh air to flow through said exchanger for heating the same, means for dividing said air, means for conducting a divided portion of said air through said chamber, a heater, means for conducting another portion of said air through said heater, through said second evaporating chamber and back through said heat exchanger in heat exchange relation with said fresh air for heating the latter.

8. In a system for dehydrating fluid products which comprises an initial evaporator, an intermediate evaporator, a dehydrator, a heat exchanger, a heater, means for causing fresh air to flow through said heat exchanger, means for dividing the air flow from said heat exchanger, means for conducting a divided portion of said air to and from said initial evaporator and for causing the same to flow spirally through said initial evaporator, means for causing the remaining portion of said air to flow through said heater for heating the same, means for mixing fresh air with said last-named heated air and for causing the same to move spirally through said dehydrator, means for conducting the air mixture to said intermediate evaporator, means for conducting said last-named air to and through said heat exchanger for heating said fresh air, means for spraying said fluid product into the stream of air in said initial evaporator, means for spraying the concentrate into said intermediate evaporator, and means for spraying the condensate from said intermediate evaporator into the stream of air flowing through said dehydrator.

9. In a system for reducing the moisture content of a fluid product which comprises a heat exchanger, an evaporator, means for conducting fresh air through said heat exchanger for heating the same, means for conducting a portion only of said air discharged from said heat exchanger to said evaporator and for causing the same to flow through said evaporator into the atmosphere, means for spraying said fluid product into the stream of air flowing through said evaporator for reducing the moisture content thereof, means for heating the remainder of said air discharged from said heat exchanger, means for utilizing said last-named air for reducing the moisture content of the concentrate from said evaporator, and a conduit for conducting said last-named air back to said heat exchanger in heat exchange relation with said fresh air for heating the latter.

10. In a system for concentrating and dehydrating a liquid product, a first stage evaporator, a heat exchanger, a heater, a second stage evaporator, a dehydrator, means for discharging a liquid product in the form of a spray into said first stage evaporator, means for conveying the concentrate from said first stage evaporator to said second stage evaporator and the concentrate from the second stage evaporator to said dehydrator, means for circulating air through said heat exchanger and for passing a portion thereof through said heater and through said dehydrator and said second stage evaporator for removing moisture from said product, and means for conducting a portion only of the air passing through said heat exchanger through said first stage evaporator for reducing the moisture content of said liquid product.

11. In a system for dehydrating liquid products, means including an evaporator for concentrating the product, means for dehydrating the concentrate from said first-named means, said last-named means comprising a dehydrator chamber, a snail above said dehydrator chamber in communication with the chamber, a heater, a heat exchanger, and means for mixing a copious supply of fresh air with a small supply of heated air within said snail just prior to its discharge spirally into said dehydrator chamber, said heated air having been preheated in said heat exchanger by the residual heat remaining in the air discharged from said dehydrator chamber and heated by said heater.

JOSEPH M. HALL.